United States Patent [19]

Vaughan et al.

[11] 4,271,043

[45] Jun. 2, 1981

[54] PILLARED INTERLAYERED CLAY PRODUCTS

[75] Inventors: David E. W. Vaughan, Columbia; Roger J. Lussier; John S. Magee, Jr., both of Ellicott City, all of Md.

[73] Assignee: W. R. Grace & Co., New York, N.Y.

[21] Appl. No.: 80,959

[22] Filed: Oct. 1, 1979

Related U.S. Application Data

[63] Continuation-in-part of Ser. No. 71,957, Sep. 4, 1979, and a continuation-in-part of Ser. No. 885,408, Mar. 10, 1978, Pat. No. 4,176,090, which is a continuation-in-part of Ser. No. 805,672, Jun. 13, 1977, abandoned, which is a continuation-in-part of Ser. No. 704,358, Jul. 12, 1976, abandoned, which is a continuation-in-part of Ser. No. 633,053, Nov. 18, 1975, abandoned.

[51] Int. Cl.$^3$ ............................................. B01J 21/16
[52] U.S. Cl. ................................................ 252/455 R
[58] Field of Search .............. 252/455 R; 423/70, 112

[56] References Cited

U.S. PATENT DOCUMENTS

| | | | |
|---|---|---|---|
| 3,850,835 | 11/1974 | Marantz et al. | 423/70 X |
| 4,033,764 | 7/1977 | Colegate et al. | 423/112 X |
| 4,176,090 | 11/1979 | Vaughan | 252/455 Z |

FOREIGN PATENT DOCUMENTS 1076786  7/1967  United Kingdom ..................... 423/112

*Primary Examiner*—Carl F. Dees
*Attorney, Agent, or Firm*—Arthur P. Savage

[57] ABSTRACT

Pillared interlayered clays are reacted with a base such as ammonium hydroxide to increase the ion exchange capacity thereof. The pillared interlayered clays are prepared by reacting a smectite clay, such as bentonite, with a metal complex polymer, such as chlorhydrol, and calcining the resulting product.

12 Claims, No Drawings

PILLARED INTERLAYERED CLAY PRODUCTS

CROSS-REFERENCE TO RELATED APPLICATIONS

This application is a continuation-in-part of our copending applications U.S. Ser. No. 885,408 filed Mar. 10, 1978, now U.S. Pat. No. 4,176,090 and 71,957 filed Sept. 4, 1979. Ser. No. 885,408 is a continuation-in-part of Ser. No. 805,672 filed June 13, 1977, now abandoned, which is a continuation-in-part of application Ser. No. 704,358 filed July 12, 1976, now abandoned, which is a continuation-in-part of application Ser. No. 633,053 filed Nov. 18, 1975, now abandoned, the subject matter of which is incorporated by reference herein.

The present application relates to the preparation of improved pillared interlayered clay products, and more specifically, to a pillared interlayered clay having a high level of ion exchange capacity which may be used in the preparation of catalysts, sorbents and ion exchangers.

In our copending applications we have described methods for preparing stable interlayered clays in which an expandable layer-type clay (smectite) is reacted with a polymeric cationic hydroxy metal complex of aluminum and/or zirconium. Upon calcination, the interlayered metal complex is decomposed to form "inorganic oxide pillars" between the expanded clay layers which are separated by a distance of about 6 to 16 A°. The resulting pillared interlayered clay products possess a unique interconnected internal micropore structure in which more than half of the pores are less than about 30 A° in diameter.

The pillared interlayered clay products are thermally stable and find wide application as hydrocarbon conversion catalysts and sorbents.

While the interlayered clay products possess some degree of ion exchange capacity, the ion exchange capability of the calcined interlayered clay products is not equivalent to the ion exchange capacity of the parent clay. It is contemplated that the utility and areas of application of our pillared interlayered clay products will be substantially enlarged by increasing the ion exchange capcity thereof.

It is therefore an object of the present invention to provide pillared interlayered clays which possess a high level of ion exchange capacity.

It is a further object to provide an efficient, economical method by which the ion exchange capacity of calcined pillared interlayered clay products may be regenerated to a level which represents a substantial part of the ion-exchange capacity of the parent smectite clay.

It is a further object to provide calcined pillared interlayered clays which may be readily ion exchanged with polyvalent metal cations to obtain active hydrocarbon conversion catalysts.

These and still further objects of the present invention will become readily apparent to one skilled in the art from the following detailed description and specific examples.

Broadly, our invention contemplates a method for increasing the ion exchange capacity of pillared interlayered clays wherein a calcined pillared interlayered clay is reacted with a base.

More specifically, we have found that the ion exchange capacity of calcined pillared interlayered clays may be increased by treating the calcined pillared interlayered clay with a base such as aqueous solutions of alkali metal or ammonium hydroxides or carbonates, or a gaseous basic reactant such as ammonia.

While the reasons why treatment with the base increases the pillared ion exchange capacity of the pillared interlayered clay products are not fully understood, it is believed that the base reacts with protons which are produced during calcination of the interlayered clay. In particular, where an aluminum polymer is used to interlayer the clay, it is believed that the aluminum polymer is decomposed upon calcination to form alumina, hydrogen ions and water in accordance with the following general reaction:

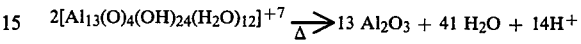

$$2[Al_{13}(O)_4(OH)_{24}(H_2O)_{12}]^{+7} \xrightarrow{\Delta} 13\ Al_2O_3 + 41\ H_2O + 14H^+$$

The alumina which is produced in accordance with the above reaction forms the pillars which support the clay layers. The protons balance the ion exchange capacity of the original clay which prior to calcination is satisfied by the positive charge on the aluminum polymer. As suggested by prior workers* in the case of H-montmorillonite, it is believed that protons migrate into the clay octahedral layer towards incompletely neutralized hydroxyl groups coordinated to magnesium, aluminum or other octahedral structure cations. We believe that migration of protons into the clay octahedral layer is basically responsible for the low ion exchange capacity of our calcined interlayered clay products.

*Footnote:
1. Russel, J. D., and Fraser, A. R. (1971) I.R. spectroscopic evidence for interaction between hydronium ions and lattice OH groups in montmorillonite: Clays and Clay Minerals 19, 55–59.
2. Harin, S., and Heller-Kallali (1973) I.R. evidence for migration of protons in H- and organo-montmorillonites: Clays and Clay Minerals 21, 199–200.

We have found that treatment of a calcined interlayered clay product with a Bronsted or Lewis type base regenerates a substantial part of the original ion exchange capacity of the parent smectite clay. Bases such as ammonia gas and aqueous solutions of ammonium and alkali-metal carbonates and hydroxides may be used. Specific basic reactants which are found to be patentably suitable include weaker bases such as gaseous ammonia, aqueous ammonium hydroxide and aqueous solutions of potassium carbonate. When strong bases are used, such as solutions of sodium and potassium hydroxides, the reaction is conducted under conditions which prevent removal of alumina from the interlayer clay structure.

In general, the bases react with the interlayered clay products in accordance with a typical acid base reaction, i.e. the protons released by the decomposition of the aluminum polymer react with a basic reagent. In the case of ammonia gas, the acid base reaction produces exchangeable ammonium ion, whereas with potassium carbonate solution an exchangeable potassium ion is produced on the clay surface.

In general, it is found that from about 0.2 to 1.0 equivalents of base is reacted with each equivalent of protons present in the calcined interlayered clay product. The reaction is preferably conducted at a temperature of from about 20° to 100° C. and requires from about 0.1 to 2.0 hours. Where aqueous solutions of basic reactants are utilized, it is found that the reactant solutions may contain from about 1 to 10 equivalents of base per liter of solution. In a particular preferred embodiment of the present invention the pillared interlayered clays are reacted with gaseous ammonia in a confined space, preferably at a temperature from about 20° to 600° C. under a pressure of from about $10^{-3}$ torr to 10 bars for periods of time ranging from about 0.1 to 2 hours. Furthermore, it is contemplated that reaction of the interlayered clay product with a gaseous base may be achieved during calcination of the product by performing the calcination step in the presence of a gaseous base containing atmosphere.

As indicated above, the calcined pillared interlayered clays are prepared in accordance with the procedures set forth in our copending applications. In general, this procedure involves:

1. A smectite clay is mixed with an aqueous solution of the high molecular weight polymeric cationic hydroxy metal complex, polymer or copolymer in amounts wherein the weight ratio of clay to metal complex ranges from about 3 to about 1. A metal complex solution is used which preferably contains from about 1 to 40 percent by weight solids in a suitable liquid medium such as water.
2. The mixture of clay and metal complex is maintained at a temperature of from about 5° to 200° C. for a period of about 0.1 to 4.0 hours.
3. The reacted clay solids are recovered from the reacted mixture and heated (calcined) to a temperature of from about 200° to 700° C. to decompose the metal complex and to form pillars of inorganic oxide which comprise from about 5 to 50% by weight of the calcined product.

The calcined interlayered clay products have an interlayer spacing of from about 6–16 angstroms, a nitrogen BET surface area of from about 150–600 m²/g and a nitrogen pore volume of from about 0.1 to about 0.6 cc/g. Furthermore, the pillared interlayered clay compositions possess a substantial internal micropore structure. The pore structure is characterized by a pore size distribution in which more than 50 percent, in many cases more than 75 percent of the surface area, is located in pores less than 40 A° in diameter as determined by conventional nitrogen pore size distribution (PSD) adsorption measurements. The ion-exchange capacity of these products is about 10 to 20% of the capacity of the starting smectite clay contained in the product, and typically range from about 5 to 30 milliequivalents/100 g (meq/100 g).

The clays used as starting materials are included in the group of minerals generally referred to as smectite type clays and represented by the general formula $(Si_8)^{IV}(Al_4)^{VI}O_{20}(OH)_4$ where the IV designation indicates an ion coordinated to four other ions, and VI designates an ion coordinated to six other ions. The IV coordinated ion is commonly $Si^{4+}$, $Al^{3+}$ and/or $Fe^{3+}$, but could also include several other four coordinate ions (i.e., $P^{5+}$, $B^{3+}$, $Ge^{4+}$, $Be^{2+}$, etc.). The VI coordinated ion is commonly $Al^{3+}$ or $Mg^{2+}$, but could also include many possible hexacoordinate ions (e.g. $Fe^{3+}$, $Fe^{2+}$, $Ni^{2+}$, $Co^{2+}$, $Li^+$, etc.). The charge deficiencies created by the various substitutions into these four and six coordinate cation positions are balanced by one or several cations located between the structural units, bonded either to the structure itself, or to the cations as a hydration shell. When dehydrated, the above structural units have a repeat distance of about 9 to 12 A° measured by X-ray diffraction. Typical commercially available clays include montmorillonite, bentonite, beidellite and hectorite. These clays typically have an ion exchange capacity of about 50 to 150 meq/100 g.

The polymeric cationic hydroxy inorganic metal complexes which are used to prepare the pillared interlayered clays are basic aluminum and zirconium complexes which are formed by the hydrolysis of aluminum and zirconium, salts. The inorganic aluminum polymers have the general formula $Al_{2+\sim}(OH)_{3\sim}X_6$ wherein $\sim$ has a value of about 4–12; and X is usually Cl, Br and/or $NO_3$. These inorganic metal polymers are generally believed to have an average molecular weight on the order of from about 500 to 1200.

The zirconium complexes used to prepare pillared interlayered clay products possess the following general formula:

$$[Zr_4(OH)_{12}(H_2O)_{12}]^{+4}$$

The preparation of the above noted aluminum and zirconium polymers is generally known to those skilled in the art and disclosed in the following references:

(a) Tsutida and Kobayashi: J. Chem. Soc. Japan (Pure Chem. Sec.), 64, 1268 (1943(discloses the reaction of solutions of $AlCl_3.6H_2O$ or HCl with an excess of metallic aluminum;

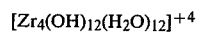
$$NAl + 2AlX_3 \xrightarrow{H_2O} Al_{2+n}(OH)_{3n}X_6$$

(b) Inove, Osugi and Kanaya: J. Chem. Soc. Japan (Ind. Chem. Sec.), 61, 407 (1958) discloses that more than an equivalent amount of aluminum hydroxide is reacted with an acid;

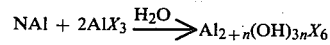
$$2 + nAl(OH)_3 + 6HX \xrightarrow{H_2O} Al_{2+n}(OH)_{3n}X_6$$

(c) H. W. Kohlschuter et al.: Z. Anorg. Allgem. Chem., 248, 319 (1941) describes a method wherein alkali is added to an aluminum salt solution;

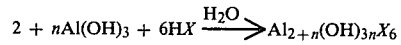
$$2 + nAlX_3 + 3nMOH \xrightarrow{H_2O} Al_{2+n}(OH)_{3n}X_6 + 3MMX$$

(d) T. G. Cwe Berg: X. Anorg. Allgem. Chem., 269 213 (1952) discloses a procedure wherein an aqueous solution of $AlX_3$ is passed through an ion exchange column of $OH^-$ form;

(e) R. Brun: German Patent No. 1,102,713 describes extended heating at ~150° C. of salts such as $AlCl_3.6H_2O$;

(f) A. Clearfield and P. A. Vaughan, Acta Cryst. 9, 555 (1956);

(g) A. N. Ermakov, I. N. Marov, and V. K. Belyaeva, Zh. Neorgan, Khim. 8, (7), 1923 (1963);

(h) G. H. Muha and P. A. Vaughan, J. Chem. Phys. 33, 194–9, (1960).

Furthermore, as indicated in our copending applications, high molecular weight metal complexes may be used to obtain pillared interlayered clays which have an exceptionally high degree of thermal stability. These polymers are obtained by increasing the molecular weight of the above noted aluminum and zirconium complexes through hydrolysis-polymerization or copolymerization.

To polymerize an initial polymer having a molecular weight of below about 1200, an aqueous solution of the polymer may be heated for a time sufficient to increase molecular weight to a level of at least about 2000 to about 20,000. In general it is found that an aqueous solution of the polymer which contains from about 0.1 to 10% solids may be heated at a temperature of from about 50° to 100° C. for a period of 0.1 to 48 hours.

Furthermore, it is contemplated that the hydrolysis-polymerization may be conducted in the presence of a base which increases the pH of the reaction mixture to a pH range of 3.5 to 6.0 for aluminum polymers. Bases such as ammonium hydroxide and sodium hydroxide or a base forming reactant such as magnesium metal are added to a heated solution of the metal complex in amounts ranging from about 0.5 to 3 equivalents of base per equivalent of complex. Where the hydrolysis-polymerization reaction is conducted in the presence of a base the solutions are reacted at a temperature of from about 50° to 100° C. for a period of from about 0.1 to 24 hours.

It is also contemplated that the high molecular weight polymers may be prepared by copolymerizing an aluminum or zirconium metal complex with a copolymerizing reactant such as $SiO_3^{-2}$, $ZrO_2^{+2}$ or $BO_3^{+3}$ which may be included in the reaction mixture as sodium silicate, zirconium chloride, boric acid or sodium borate. Polymers having a suitable molecular weight are obtained by reacting from about 0.05 to 1.0 mols of copolymerizing reactant with each mol of starting low molecular weight complex. The reactions are conducted in aqueous solutions which contain up to 25 percent by weight solids and are conducted at temperatures on the order of 50° to 100° C. for periods of 0.1 to 24 hours.

The pillared interlayered clay product ion exchanged and/or impregnated with ions and/or metals of Groups IIB through VIII of the Periodic Table may be utilized in the preparation of catalysts such as petroleum conversion catalysts, including catalytic cracking catalysts, hydrocracking catalysts, isomerization catalysts, reforming catalysts, alkylation catalysts, as well as sorbents used as desiccants and as moelcular sieves. Furthermore, the compositions of the present invention may be utilized to remove or separate ions from aqueous solutions and as such find use in the preparation of detergents.

In general, it is found that through the use of the present process the ion-exchange capacity of the initial calcined pillared interlayered clay product is readily increased from a level of about 5 to 60 meq/100 g to about 40 to 140 meq/100 g, depending on the clay.

Having generally described the basic aspects of our invention, the following examples are given to illustrate specific embodiments thereof.

EXAMPLE 1

This example describes the preparation of a chlorhydrol (aluminum chlorhydroxide, Reheis Chemical Co.) pillared interlayered clay. 163.2 g of chlorhydrol (23.5% $Al_2O_3$) was diluted to 3.0 l and 312.5 g as is (250 g dry basis) Ca Bentonite (American Colloid Co.) was added with rapid agitation. The slurry was hot aged 1 hour at 150° F., filtered, washed twice with 3.0 l hot deionized $H_2O$, and oven dried. After a one hour at 1000° F. thermal treatment, the surface area of this sample was 265 $m^2/g$. After an 8 hour, 1250° F., 5 psi steam treatment this sample gave 49.9% conversion in a catalytic cracking microactivity test unit using the procedure described by Ciapetta and Henderson, Oil & Gas Journal, Oct. 16, 1967, page 88.

EXAMPLE 2

This example shows the relatively low exchange capacity of calcined interlayered clay. 10 g of a spray dried interlayered clay prepared in a similar manner to the sample in Example 1 was calcined 2 hours at 1000° F. The calcined interlayered clay was added to 250 ml of $H_2O$ containing 4.33 g $La(NO_3)_3.6H_2O$, hot aged one-half hour at 150° F., filtered, washed twice with ¼ l hot $H_2O$ and oven dried. This sample had substantial surface area reduction due to the exchange (from 286 to 185 $m^2/g$) and only picked up 0.7% $La_2O_3$. Thus, the exchange capacity of the calcined interlayered clay is about 13 meq/100 g. It is noted that allowing for loss in exchange capacity due to dilution from the alumina pillar component, the exchange capacity would be expected to be about 64 meq/100 g. Accordingly, the product possesses only about 20% of the capacity of the starting bentonite which possesses a capacity of about 80 meq/100 g.

EXAMPLE 3

This example shows the effect of gaseous $NH_3$ on exchange capacity and hydrothermal stability. 25 g of an interlayered clay prepared in a similar way to that in Example 1 was calcined 1 hour at 1000° F. This sample was placed in a vacuum desiccator in a thin bed in a porcelain dish along with 10 ml concentrated (30% $NH_3$) $NH_4OH$ in a beaker. The desiccator was evacuated for 5 minutes, the sample was removed, then added to a 300 ml solution containing 3.7 g $LaCl_3.7H_2O$ and aged for 5 minutes; filtered, washed twice with 250 ml of hot $H_2O$ and oven dried. This sample had a surface area of 295 $m^2/g$ and contained 1.9 wt% exchanged $La_2O_3$. After an eight hour, 1250° F., 5 psi steam deactivation this sample gave 68% catalytic cracking microactivity conversion versus 49.9% conversion for the non-base treated sample in Example 1.

EXAMPLE 4

25 g of a calcined (1 hour at 1000° F.) interlayered clay was slurried in 50 ml of 3% $NH_4OH$ for one-quarter hour at room temperature, filtered, and washed 3 times with 500 ml deionized $H_2O$. The sample was reslurried in 500 ml $H_2O$, the pH was adjusted to 5.0 with 3.75% HCl, 9.3 g $LaCl_3.7 H_2O$ were added. After a half-hour hot age at 150° F. (pH maintained between 4.0-5.0), the sample was filtered, washed twice with 500 ml of hot $H_2O$, and oven dried. The surface area after exchange was 232 $m^2/g$ and the exchanged $La_2O_3$ content was 2.3% by weight.

EXAMPLE 5

This example shows that $K_2CO_3$ can be used as the basic reagent in this process. 2.48 g $K_2CO_3$ was dissolved in ½ l $H_2O$ and heated to 80° C. 25 g of interlayered clay (calcined 1 hour at 1000° F.) was added to this solution, and the whole aged 1 hour, then filtered and washed twice with ½ l hot $H_2O$. The product was reslurried in ½ l solution containing 5.55 g $LaCl_3.7 H_2O$ for one-quarter hour at room temperature, filtered, washed twice with ½ l hot $H_2O$ and oven dried. The surface area after $La^{+3}$ exchange was 246 $m^2/g$ (versus 270 $m^2/g$ before exchange) and the $La_2O_3$ exchange level was 2.7% by weight. Accordingly, the product possesses an ion exchange capacity of about 50 meq/100 g or 78% of the original capacity of the clay contained in the product.

EXAMPLE 6

This example shows the base exchange treatment allows exchange of reactive transition metals. 152 g chlorhydrol (23.5% $Al_2O_3$) was diluted to 3.0 l, 200 g (dry basis) of No. 325 Bentonite was added, and the whole hot aged for 1 hour at 160° F. and pH 5.0. The product was filtered, washed twice with 3.0 l hot $H_2O$ and oven dried. The product was calcined for 1 hour at 1000° F. and then exposed to an $NH_3$ gas atmosphere in a vacuum desiccator for 15 minutes. The ammoniated calcined interlayered clay was slowly added to 1.0 l of solution containing 47.6 g $NiCl_2$ 6 $H_2O$ and aged one-quarter hour at room temperature and a pH of less than about 5.0. The slurry was filtered, and the filter cake washed twice with ½ l $H_2O$, and oven dried. The surface area after exchange was 277 $m^2/g$ versus 247 $m^2/g$ before the exchange and the NiO exchange level was 2.38% by weight. Th product had an ion exchange capacity of about 62 meq/100 g or about 97% of the original capacity of the clay component.

The above description and examples indicate that valuable pillared interlayered clay products having high ion exchange capacity may be produced by the procedures set forth herein.

We claim:

1. A process for preparing a pillared interlayered clay product having a high degree of ion exchange capacity which comprises:
    (a) reacting a smectite clay with a mixture of a polymeric cationic hydroxy metal complex selected from the group consisting of polymeric cationic hydroxy aluminum and zirconium complexes and water to obtain a pillared interlayered smectite;
    (b) calcining said interlayered smectite to obtain an interlayered clay product having greater than 50% of its surface area in pores less than 30 Å in diameter; and
    (c) reacting said calcined interlayered clay product with a base to increase the ion exchange capacity thereof.

2. The method of claim 1 wherein said smectite is selected from the group consisting of bentonite, montmorillonite and hectorite.

3. The method of claim 1 wherein the said metal complex has a molecular weight of from about 600 to 20,000.

4. The method of claim 1 wherein said interlayered smectite clay is calcined at a temperature of from about 200° to 700° C.

5. The method of claim 1 wherein said base is selected from the group consisting of solutions of alkali metal and ammonium hydroxides and carbonates and ammonia gas.

6. The method of claim 6 wherein said base is reacted with the interlayered smectite during calcination.

7. The method of claim 1 wherein said calcined interlayered clay product is reacted with from about 1 to 10 mols or equivalents of said base per equivalent of proton contained in said calcined interlayered clay product.

8. The method of claim 6 wherein said base and said calcined interlayered clay product are reacted for a period of from about 0.1 to 2 hours at a temperature of from about 20° to 100° C.

9. A pillared interlayered smectite clay composition prepared by the method of claim 1.

10. A hydrocarbon conversion catalyst comprising the composition of claim 1 exchanged and/or impregnated with a polyvalent metal ion and/or metal selected from Groups IIB to VIII of the Periodic Table.

11. A sorbent comprising the product of claim 1.

12. The method of claim 3 wherein said metal complex is a copolymer obtained by reacting a polymeric cationic hydroxy aluminum or zirconium complex with an aqueous solution of a copolymerizing reactant selected from the group consisting of silicate, zirconate and borate.

* * * * *